Nov. 10, 1936.  O. KLEIN  2,060,396
MACHINE FOR GRINDING VALVES OF THE MUSHROOM OR POPPET TYPE
Filed Feb. 23, 1933  2 Sheets-Sheet 1

Nov. 10, 1936. O. KLEIN 2,060,396
MACHINE FOR GRINDING VALVES OF THE MUSHROOM OR POPPET TYPE
Filed Feb. 23, 1933 2 Sheets-Sheet 2

Patented Nov. 10, 1936

2,060,396

UNITED STATES PATENT OFFICE 2,060,396

MACHINE FOR GRINDING VALVES OF THE MUSHROOM OR POPPET TYPE

Otto Klein, Stuttgart-Oberturkheim, Germany

Application February 23, 1933, Serial No. 658,166
In Germany March 1, 1932

4 Claims. (Cl. 51—95)

The known valve head grinding machines with the grinding spindle rigidly mounted for producing perfect grinding work are open to the objection that only the valve heads to be ground rotate automatically around their own axis but are not at the same time reciprocated, that is do not carry out an oscillating movement, wherefrom results that the grinding surface of the grinding wheel becomes uneven, which is also the case when a reciprocating movement is imparted to the valve head by hand because the necessary uniformity can never be attained by this hand movement.

This objection is overcome by the valve head grinding machine which will be hereinafter described in that the valve head clamped in a horizontal valve holder is driven by a shaft journalled in a vertical sleeve and, for adjusting to any degree of inclination, is swung and fixed on this vertical sleeve provided with an adjusting scale. This vertical shaft is driven from a parallel second shaft which, by means of an eccentric pin mounted on its lower end, imparts a reciprocating movement to the whole valve head carrier, which is axially shiftable and fixable on two parallel guide rods. The upper part of the valve head carrier is rotatably and fixably mounted on the upper, stationary extension pin of the valve head carrier, which is coaxial to the second vertical shaft and has an arrangement for retaining the previously adjusted grinding angle during the swinging of the upper part around the extension pin always in the same adjusted inclined position relative to the grinding wheel. The drive is effected by a third shaft, which can be driven either by the grinding spindle or by some other means, and on which, in the example in question, the driving worm is axially shiftable.

In a modified form of construction according to the invention, wherein the grinding spindle is likewise stationary, the oscillating movement of the valve head is driven by means of a toothed wheel gearing or the like from the valve holder driven in any suitable manner.

Three embodiments of the invention are illustrated by way of example in the accompanying drawings in which:—

Figure 1:
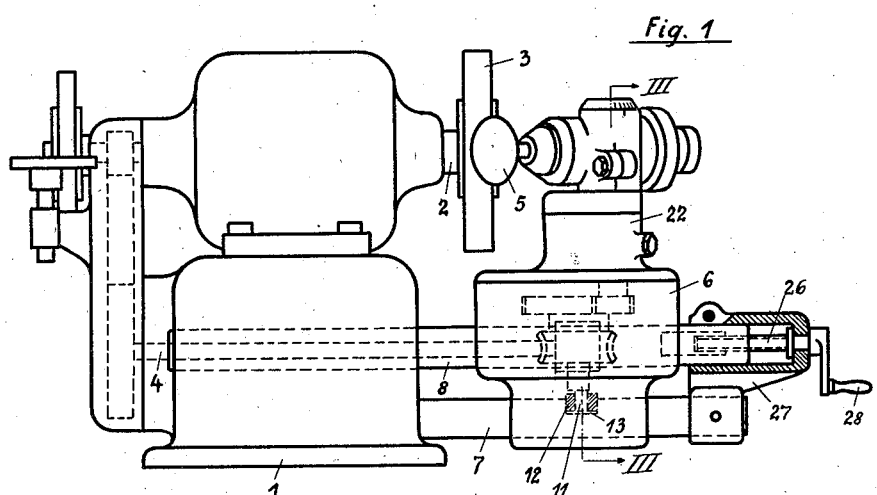
Fig. 1 shows one form of construction of a valve head grinding machine in front elevation, partly in section.
Figure 2:
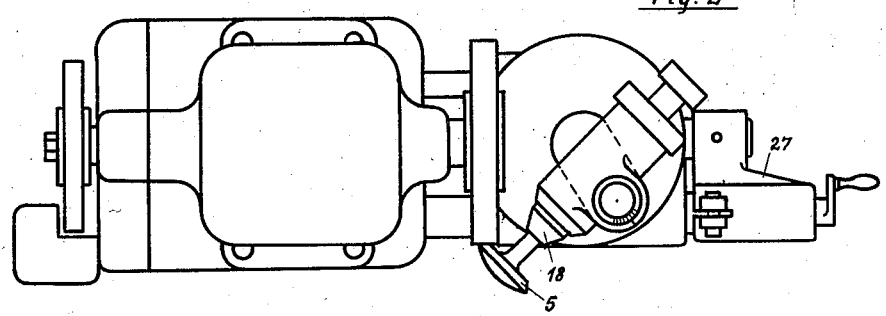
Fig. 2 is a top plan view of Fig. 1.
Figure 3:
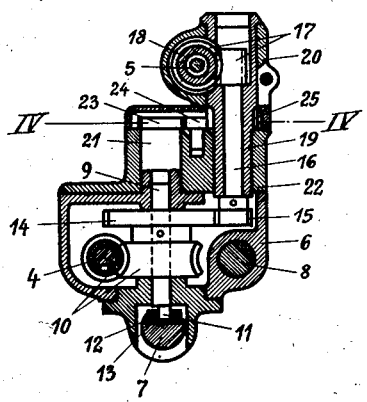
Fig. 3 is a vertical section through the gearing taken on line III—III of Fig. 1.

In the first form of construction a grinding spindle 2, driven in any suitable manner, is mounted on a base 1 and carries, besides an emery wheel 3 necessary for grinding the valve heads, a second emery wheel, or can be employed for driving flexible shafts. This grinding spindle 2 likewise drives, by means of a belt transmission or any other suitable manner, a shaft 4 which imparts to the valve head 5 not only a rotary but also a reciprocating or oscillating movement parallel to the grinding spindle 2. This is attained in that the valve head carrier 6, which is axially slidable on parallel guide bars 7 and 8, carries a vertical shaft 9 which is uniformly rotated by means of a worm gearing 10. The vertical shaft 9 is provided on its lower end with an eccentric pin 11 rotating in a quadrangular guide block 12 guided in longitudinal direction without play in a transverse slot 13 in the stationary guide bar 7 so that the vertical shaft 9, in rotating, imparts a reciprocatory movement to the whole valve head carrier 6. The vertical shaft 9 at the same time drives, through the intermediary of toothed wheels 14 and 15, a parallel shaft 16 which rotates a valve holder 18 through the intermediary of a worm drive 17. A casing 20, rotatably mounted on a sleeve 19 serving for adjusting to different angles and provided on its upper end with an adjusting scale, can be swung and fixed together with an upper part 22 of the valve head carrier 6 around a stationary extension pin 21 of the valve head carrier 6, coaxial to the shaft 9, in order to obtain the transverse movement relative to the grinding axis necessary for adjusting the valve head on the grinding wheel.

Figure 4:
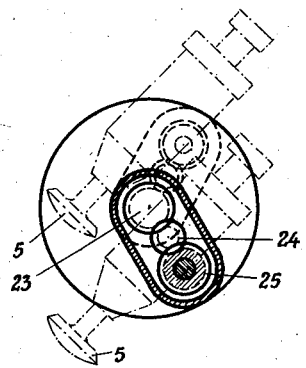
Fig. 4 is a top plan view illustrating the transverse movement of the valve head holder with section on line IV—IV of Fig. 3.

In order to prevent the angular adjustment once properly set from changing during the swinging around the vertical extension pin 21, the sleeve 19 is automatically held with the valve holder casing 20 clamped thereon, exactly in the adjusted angular position by means of a toothed wheel gearing 23, 24, 25. This is attained in a very simple manner in that the central wheel 23 is keyed on the stationary vertical extension pin 21 and the intermediate wheel 24, rotatably mounted in the pivotally mounted upper part 22 of the valve head carrier 6, rolls around this central wheel. The toothed wheel 25 keyed on the sleeve 19 has the same number of teeth as the central wheel 23 and is oscillated around the centre of this wheel 23 without itself rotating, so that the adjusted angular position of the valve carrier casing 20 clamped on the sleeve 19 can never change during the adjustment of the valve head relative to the grinding wheel (Fig. 4).

The longitudinal adjustment of the valve head carrier 6 is effected by a screw spindle 26 engaging the front end of the stationary guide bar 8 and rotatably mounted in a connecting bearing 27, so that, when rotated by a crank 28, this spindle 26 shifts the connecting bearing 27 in longitudinal direction together with the guide rod 7 fixed therein which positively shifts the valve head carrier 6 by means of the guide block 12 mounted in the slot 13, so that the worm of the worm drive 10 mounted on the shaft 4 is likewise axially shifted.

Figure 6:
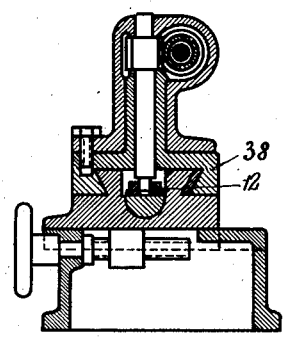
Fig. 6 is a transverse sectional view of Fig. 5.
Figure 5:
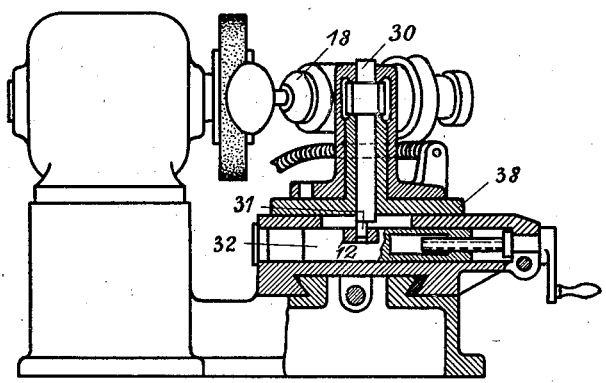
Fig. 5 shows a second form of construction of valve head grinding machine in front elevation partly in section.

The second type of construction is shown in two forms of construction. The second form of construction illustrated in Figs. 5 and 6 is characterized in that the valve holder 18, arranged on a compound rest and driven by a flexible shaft, drives a vertical shaft 30 by means of a worm wheel gearing. On the lower portion of this shaft 30 an eccentric pin 31 is arranged which, through the intermediary of the guide block 12, engages with the shaft 32, axially shiftable and locked against rotation, and thus likewise automatically axially reciprocates the valve holder carrier during its rotation.

Figure 8:
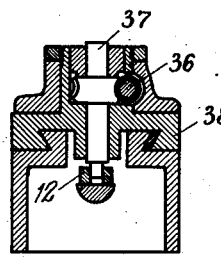
Fig. 8 is a transverse sectional view of Fig. 7.
Figure 7:
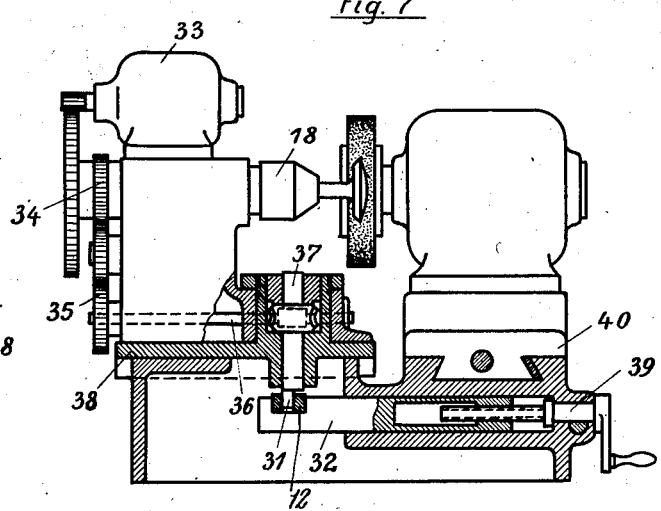
Fig. 7 shows a third form of construction in front elevation partly in section.

In the third form of construction illustrated in Figs. 7 and 8 the valve holder 18 is driven by a motor 33 or some other suitable means. The valve holder 18 drives a worm shaft 36 through the intermediary of toothed wheels 34 and 35 or the like and this shaft rotates a vertical shaft 37 on the lower end of which an eccentric pin 31 is arranged which, through the intermediary of the guide block 12, engages with a shaft 32 which is axially adjustable and locked against rotation, so that during the rotation of the pin 31 a reciprocating movement is automatically imparted to the valve holder carriage 38.

The upper part of the valve holder carriage 38 is pivotally mounted and fixable on the axle 37 for adjusting the valve holder to the desired angle, the axial displacement of the valve holder being effected by the spindle 39. The transverse movement necessary for adjusting the grinding wheel is carried out by shifting a transverse carriage 40 on which the grinding motor is mounted.

The axially shiftable shaft 32, which is locked against rotation, serves in the second and third forms of construction for the adjustment for the longitudinal carriage 38 shiftable parallel to the grinding spindle axis and on which the upper part 38' is adjustable and fixable at any angle with the valve holder 18.

The stroke of the eccentric pin can be regulated in the two last mentioned forms of construction by mounting the eccentric pin 31 on a separate shaft, adapted to be eccentrically adjusted and fixed in the shaft 30 or 37.

I claim:—

1. An automatic valve head grinding machine, comprising in combination a grinding spindle, a horizontal shaft driven by said grinding spindle, a vertical shaft driven by said horizontal shaft, an eccentric pin on the lower end of said vertical shaft, a guide block loosely engaging said eccentric pin, a valve holder carrier surrounding said vertical shaft, two stationary guide bars extending through said carrier, one of said bars having a slot for guiding said block without play, to impart at each rotation of said vertical shaft a reciprocatory movement to said carrier guided on said bars corresponding to the throw of said eccentric pin and parallel to said grinding spindle.

2. An automatic valve head grinding machine, comprising in combination a grinding spindle, a horizontal shaft driven by said grinding spindle, a vertical shaft driven by said horizontal shaft, an eccentric pin on the lower end of said vertical shaft, a guide block loosely engaging said eccentric pin, a valve holder carrier surrounding said vertical shaft, two stationary guide bars extending through said carrier, one of said bars having a slot for guiding said block without play, to impart at each rotation of said vertical shaft a reciprocatory movement to said carrier guided on said bars corresponding to the throw of said eccentric pin and parallel to said grinding spindle, and a screw spindle engaging one of said guide bars adapted to longitudinally adjust said valve holder carrier.

3. In an automatic valve head grinding machine, a grinding spindle, a horizontal shaft driven by said grinding spindle, a vertical shaft driven by said horizontal shaft, an eccentric pin on the lower end of said vertical shaft, a guide block loosely engaging said eccentric pin, a valve holder carrier surrounding said vertical shaft, two stationary guide bars extending through said carrier, one of said bars having a slot for guiding said block without play to impart at each rotation of said vertical shaft a reciprocatory movement to said carrier guided on said bars corresponding to the throw of said eccentric pin and parallel to said grinding spindle, a stationary extension on the upper end of said carrier coaxial to said vertical shaft, an upper part of said carrier rotatable around said stationary extension, a sleeve in said upper part, a casing rotatable and fixable on said sleeve and rotatably carrying the valve head, said casing adapted to be swung with said upper part of the casing about said stationary extension to move said carrier transversely to the grinding axis.

4. In an automatic valve head grinding machine, a grinding spindle, a horizontal shaft driven by said grinding spindle, a vertical shaft driven by said horizontal shaft, an eccentric pin on the lower end of said vertical shaft, a guide block loosely engaging said eccentric pin, a valve holder carrier surrounding said vertical shaft, two stationary guide bars extending through said carrier, one of said bars having a slot for guiding said block without play to impart at each rotation of said vertical shaft a reciprocatory movement to said carrier guided on said bars corresponding to the throw of said eccentric pin and parallel to said grinding spindle, a stationary extension on the upper end of said carrier coaxial to said vertical shaft, an upper part of said carrier rotatable around said stationary extension, a sleeve in said upper part, a casing rotatable and fixable on said sleeve and rotatably carrying the valve head, said casing adapted to be swung with said upper part of the casing about said stationary extension to move said carrier transversely to the grinding axis, a central toothed wheel keyed on said stationary extension, an intermediate toothed wheel meshing with said central wheel, and a third toothed wheel keyed on said sleeve adapted to allow said upper part to be turned around said stationary extension without rotating said sleeve.

OTTO KLEIN.